United States Patent
Messinger

(10) Patent No.: US 11,030,893 B1
(45) Date of Patent: Jun. 8, 2021

(54) SYSTEM FOR REDUCING SPEED OF A VEHICLE AND METHOD THEREOF

(71) Applicant: Samuel Messinger, Ramot Bet Shemish (IL)

(72) Inventor: Samuel Messinger, Ramot Bet Shemish (IL)

(*) Notice: Subject to any disclaimer, the term of this patent is extended or adjusted under 35 U.S.C. 154(b) by 0 days.

(21) Appl. No.: 16/893,445

(22) Filed: Jun. 5, 2020

(51) Int. Cl.
  *G08G 1/04* (2006.01)
  *G06K 9/00* (2006.01)
  *G07B 5/04* (2006.01)
  *E01F 9/529* (2016.01)
  *G08G 1/017* (2006.01)
  *H04N 5/232* (2006.01)

(52) U.S. Cl.
  CPC ........... *G08G 1/0175* (2013.01); *E01F 9/529* (2016.02); *G06K 9/00785* (2013.01); *G07B 5/04* (2013.01); *G08G 1/04* (2013.01); *H04N 5/23203* (2013.01); *G06K 2209/23* (2013.01)

(58) Field of Classification Search
  CPC ......... G08G 1/0175; G08G 1/04; E01F 9/529; G06K 9/00785; G06K 2209/23; G07B 5/04; H04N 5/23203
  See application file for complete search history.

(56) References Cited

U.S. PATENT DOCUMENTS

| | | | | |
|---|---|---|---|---|
| 6,024,510 | A * | 2/2000 | Kamienchick | E01F 9/529 404/15 |
| 6,166,658 | A | 12/2000 | Testa | |
| 6,754,663 | B1 * | 6/2004 | Small | G07B 15/06 |
| 6,760,061 | B1 * | 7/2004 | Glier | G08G 1/04 340/435 |
| 7,645,090 | B2 | 1/2010 | Rastegar | |
| 8,684,625 | B2 | 1/2014 | Garcia Garcia | |
| 9,505,494 | B1 * | 11/2016 | Marlow | B64C 39/024 |
| 10,102,586 | B1 * | 10/2018 | Marlow | G06Q 40/08 |

(Continued)

FOREIGN PATENT DOCUMENTS

| | | | | |
|---|---|---|---|---|
| CN | 205230347 U | * | 5/2016 | ............ G08G 1/04 |
| EP | 1698729 A1 | * | 9/2006 | ............ E01F 9/529 |

(Continued)

OTHER PUBLICATIONS

National Association of City Transportation Officials NACTO Urban Street Design Guide Speed Table.

(Continued)

*Primary Examiner* — Reza Aghevli

(57) ABSTRACT

The present invention provides a system (1000) for reducing speed of a vehicle and a method thereof which reduces the speed of the vehicle and increases fuel efficiency. The system (1000) comprises at least one protruding element (200) positioned on a surface of a roadway (110) such that the at least one protruding element (200) interrupts a smooth movement of the vehicle (100); and at least one camera (400) located away from the at least one protruding element (200) such that the at least one camera (400) is able to capture images of a monitored area of the roadway (110). The at least one camera (400) is configured to capture at least one image of a moving vehicle (100) going around and avoiding the at least one protruding element (200) in the monitored area of the roadway (110). A method for reducing speed of a vehicle is also disclosed.

20 Claims, 3 Drawing Sheets

(56) References Cited

U.S. PATENT DOCUMENTS

| | | | |
|---|---|---|---|
| 2004/0056778 A1* | 3/2004 | Hilliard | G08G 1/042 340/933 |
| 2006/0015245 A1* | 1/2006 | Janssen | G08G 1/054 701/117 |
| 2007/0069920 A1* | 3/2007 | Hakki | G08G 1/0175 340/907 |
| 2007/0258764 A1 | 11/2007 | Broughton | |
| 2011/0094840 A1* | 4/2011 | Sakita | B60L 53/12 191/2 |
| 2014/0379384 A1* | 12/2014 | Duncan | G06Q 40/08 705/4 |
| 2014/0379385 A1* | 12/2014 | Duncan | G07C 5/008 705/4 |
| 2015/0166062 A1* | 6/2015 | Johnson | B60W 10/20 701/41 |
| 2015/0216021 A1* | 7/2015 | Bennett | E01F 9/529 362/555 |
| 2016/0181970 A1* | 6/2016 | Sato | B60L 8/003 136/246 |
| 2017/0032666 A1* | 2/2017 | Pretorius | G08G 1/04 |
| 2018/0224863 A1* | 8/2018 | Fu | G01C 21/3602 |
| 2019/0291727 A1* | 9/2019 | Shalev-Shwartz | B60W 10/04 |
| 2019/0316914 A1* | 10/2019 | Shin | G01C 21/30 |
| 2020/0156618 A1* | 5/2020 | Kook | B60W 10/11 |
| 2020/0311846 A1* | 10/2020 | Chen | G08G 1/202 |
| 2020/0346654 A1* | 11/2020 | Kojo | G08G 1/096725 |
| 2020/0377087 A1* | 12/2020 | Chen | G06K 9/00798 |
| 2020/0406691 A1* | 12/2020 | Lehning | G08G 1/054 |

FOREIGN PATENT DOCUMENTS

| | | | | |
|---|---|---|---|---|
| EP | 1698729 B1 | | 2/2010 | |
| KR | 2016062880 A | * | 6/2016 | G08G 1/01 |
| KR | 1832704 B1 | * | 2/2018 | G06K 9/3258 |
| WO | WO2009007489 | | 1/2009 | |

OTHER PUBLICATIONS

Updated Guidelines for Design and Application of Speed Bumps Margaret Parkhill, P. Eng.
Civil Engineering Journal Jun. 6, 2018 vol. 4 Public Evaluation of Speed Humps, Performance and Effectiveness.
Vehicular Emissions and Fuel Consumption for Street Characteristics in Residential Areas Lena Smidfelt Rosquist Dr. Traffic Planning Sweden.
Are Speed Bumps Hurting the Environment gofar.com.
City of San Pablo CA Speed Hump Plan and Notes.

* cited by examiner

SYSTEM FOR REDUCING SPEED OF A VEHICLE AND METHOD THEREOF

FIELD OF THE INVENTION

The present invention generally relates to speed reducing measures and road safety. More particularly, the present invention relates to a system for reducing speed of a vehicle and a method thereof which reduces the speed of the vehicle and increases fuel efficiency.

BACKGROUND OF THE INVENTION

Speed bumps (known by many names such as, but not limited to, traffic thresholds or speed breakers) are the common name for traffic calming devices that use vertical deflection to slow motor-vehicle traffic and prevent vehicles from travelling at high speed by creating barriers and giving jerks to the vehicles travelling at high speed and sometimes slow speed over the speed bumps. These traffic calming devices regulates the speed of road traffic in order to improve safety conditions.

Currently, there are different types of designs of the traffic calming devices which are placed on the public thoroughfares. Variations include, but not limited to, speed bump, speed hump, speed cushion, or speed table. The speed humps are relatively wider than the speed bumps, inclining at a lower angle, and are half the height. Thus, the speed humps cause drivers to slow down rather than stopping completely like speed bumps do. Generally, the speed bumps are raised 3-4 inches above the road and are intended to reduce driving speed to less than 5 mph. The speed bumps are often installed in areas with high pedestrian traffic, such as residential communities and parking lots.

The traffic calming devices also include rumble strips which is commonly referred to as audio tactile profiled markings. The rumble strips have a different purpose than the speed bumps. The rumble strips are grooved strips of pavement that are designed to alert distracted drivers rather than affect the speed of the vehicle. The rumble strips catch attention through tactile vibrations and audible rumbling as the wheels of the vehicle come in contact with rapid, inch-deep grooves in the road.

However, such conventional traffic calming devices include various disadvantages such as, but not limited to, damage caused to emergency vehicles when crossed at high speeds, scraping the bump of low-riding vehicles even at low speeds, interrupting steady flow of traffic, and causing accidents. In particular, the conventional speed bumps can damage the bumper of the vehicle, undercarriage, and possibly steering rack. Also, if the vehicle crosses the speed bump too fast, then the speed bump scrapes or dings the underside, damaging the sump and leaking oil. The conventional rumble strips tend to tear the tyres of the vehicles and suspension if the vehicle is driven hundreds of miles on them regularly, but most segments last less than a mile in exit ramps. Thus, the rumble strips are no worse than wear and tear endured by the vehicle on a daily basis.

Further, these conventional speed bumps results in body wear such as weak suspension, bad alignment, or cracking tires and thus, lower the life of the vehicle such as, but not limited to, delivery trucks, cars, buses, motorcycles, or vans in the long run. Furthermore, acceleration and de-acceleration that happens due to the speed bumps leads to premature wearing of brake pads and also increase in suspension load. In particular, speed bumps damage parts of steering and suspension system such as, but not limited to, shocks, struts, and joints, as well as exhaust parts, chassis or oil pan. Additionally, the conventional speed bumps lower the fuel efficiency and increase emissions such as, but not limited to, $CO$, $CO_2$ or $NOx$ emissions thus contributing in global warming. In other words, such conventional speed bumps cause more fuel to be burned and wear and tear of the vehicle which is quite expensive.

Therefore, there exists a need to provide for a speed reducing system which would in turn address variety of issues including, but not limited to, avoiding the risk of accidents, reducing wear and tear of the components of the vehicle, and reduction of suspension load and the rate of emissions from the vehicles. Moreover, there is a need to provide a system for reducing speed of a vehicle which reduces the speed of the vehicle and avoids wastage of fuel. Also, there is a need to develop a system for reducing speed of a vehicle which increases the life of the vehicle and is economical.

SUMMARY OF THE INVENTION

The following presents a simplified summary of the invention to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

It is, therefore, an object of the present invention to provide a system for reducing speed of a vehicle which effectively reduces the speed of the vehicles. The system for reducing speed of a vehicle in view of the foregoing disadvantages inherent in the prior-art, the general purpose of the present invention is to provide a system for reducing speed of a vehicle that is capable of including all advantages of the prior art and also overcomes the drawbacks inherent in the prior art offering some added advantages.

It is another object of the present invention to provide a system for reducing speed of a vehicle which reduces the alignment and balancing problem in the vehicles.

It is another object of the present invention to provide a system for reducing speed of a vehicle which reduces body wear such as weak suspension and avoids premature tire wear and thus, increases the life of the vehicle in the long run.

It is still another object of the present invention to provide a system for reducing speed of a vehicle which avoids the wastage of fuel or gas.

Accordingly, in an aspect, the present invention provides a system for reducing speed of a vehicle comprising at least one protruding element and at least one protruding element. The at least one protruding element is positioned on a surface of a roadway such that the at least one protruding element interrupts a smooth movement of the vehicle. The at least one camera is located away from the at least one protruding element such that the at least one camera is able to capture images of a monitored area of the roadway provided with the at least one protruding element. Further, the at least one camera is configured to capture at least one image of a moving vehicle going around and avoiding the at least one protruding element in the monitored area of the roadway.

Accordingly, in another aspect, the present invention provides a method for reducing speed of a vehicle comprising the steps of comprising the steps of positioning at least one protruding element on a surface of a roadway such that the at least one protruding element interrupts a smooth movement of the vehicle; locating at least one camera away from the at least one protruding element such that the at least one camera is able to capture images of a monitored area of the roadway provided with the at least one protruding element; and capturing at least one image of a moving vehicle going around and avoiding the at least one protruding element in the monitored area of the roadway, by the at least one camera.

Other aspects, advantages, and salient features of the invention will become apparent to those skilled in the art from the following detailed description, which, details the invention in different embodiments.

BRIEF DESCRIPTION OF THE DRAWINGS

The embodiments herein will be better understood from the following detailed description with reference to the drawings, in which.

DETAILED DESCRIPTION OF THE INVENTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The use of terms "including," "comprising," or "having" and variations thereof herein are meant to encompass the items listed thereafter and equivalents thereof as well as additional items.

Further, the terms, "an" and "a" herein do not denote a limitation of quantity, but rather denote the presence of at least one of the referenced item.

Figure 1:
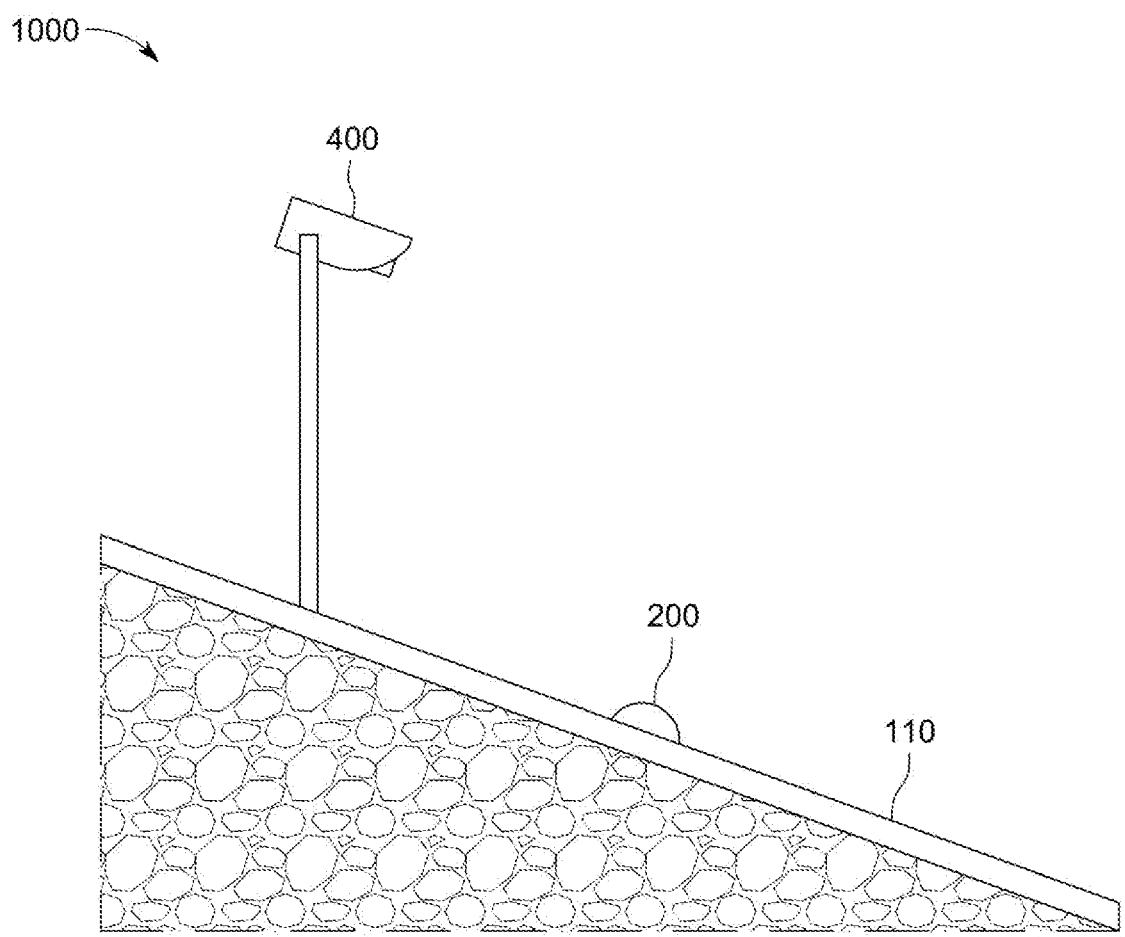
FIG. 1 illustrates a side view of a system for reducing speed of a vehicle in accordance with an embodiment of the present invention.

Referring to the drawings, the invention will now be described in more detail. A system (1000) for reducing speed of a vehicle, as shown in FIG. 1, comprises at least one protruding element (200) and at least one camera (400). The system (1000) refers to a traffic speed controlling system which may be installed on any types of roadways (110), preferably on highways, flyovers, bridges, elevated roads or the like.

In accordance with an embodiment of the present invention, the at least one protruding element (200) is positioned on a surface of a roadway (110) such that the at least one protruding element (200) interrupts a smooth movement of the vehicle (100). In other words, the at least one protruding element (200) intervenes in the path of a moving vehicle (100) and, as a consequence, in the speed of the vehicle (100).

Figure 2:
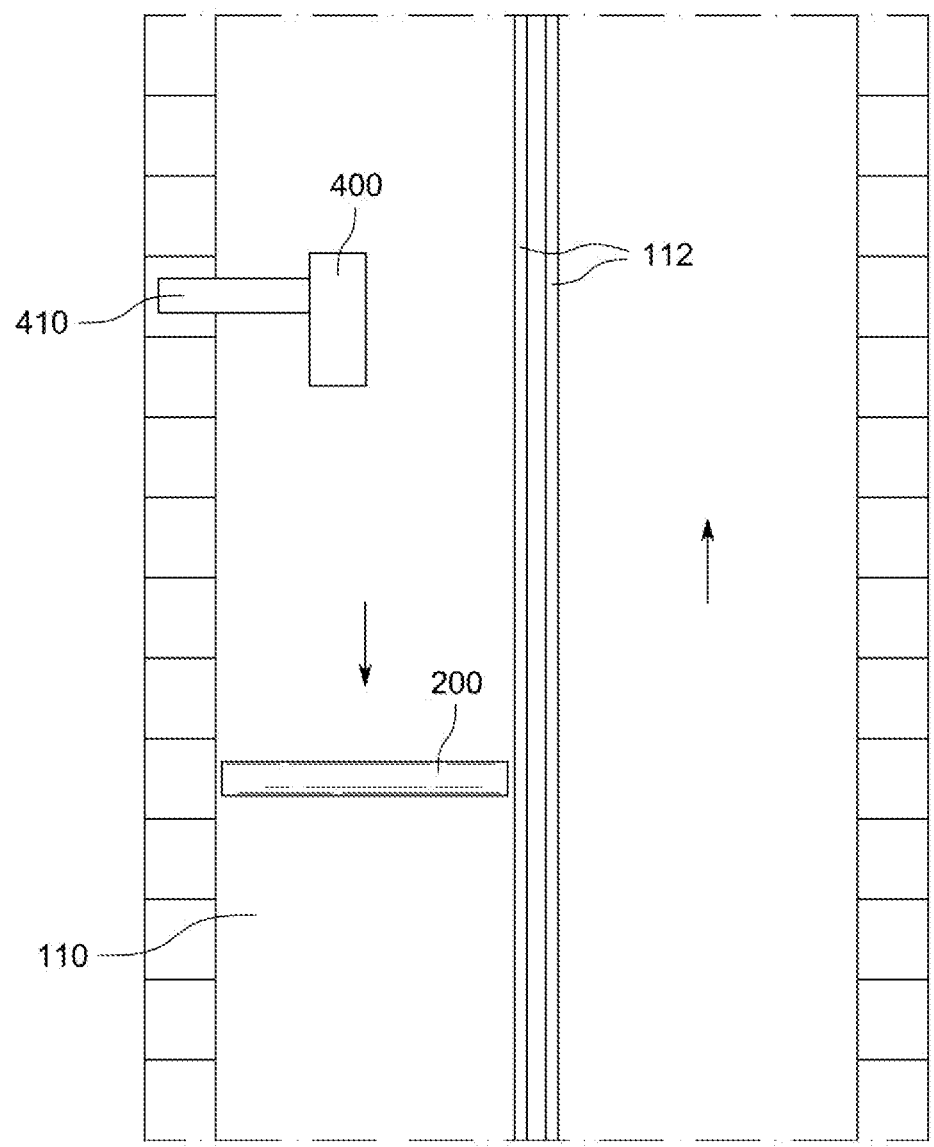
FIG. 2 illustrates a top view of the system for reducing speed of a vehicle in accordance with an embodiment of the present invention.
Figure 3:
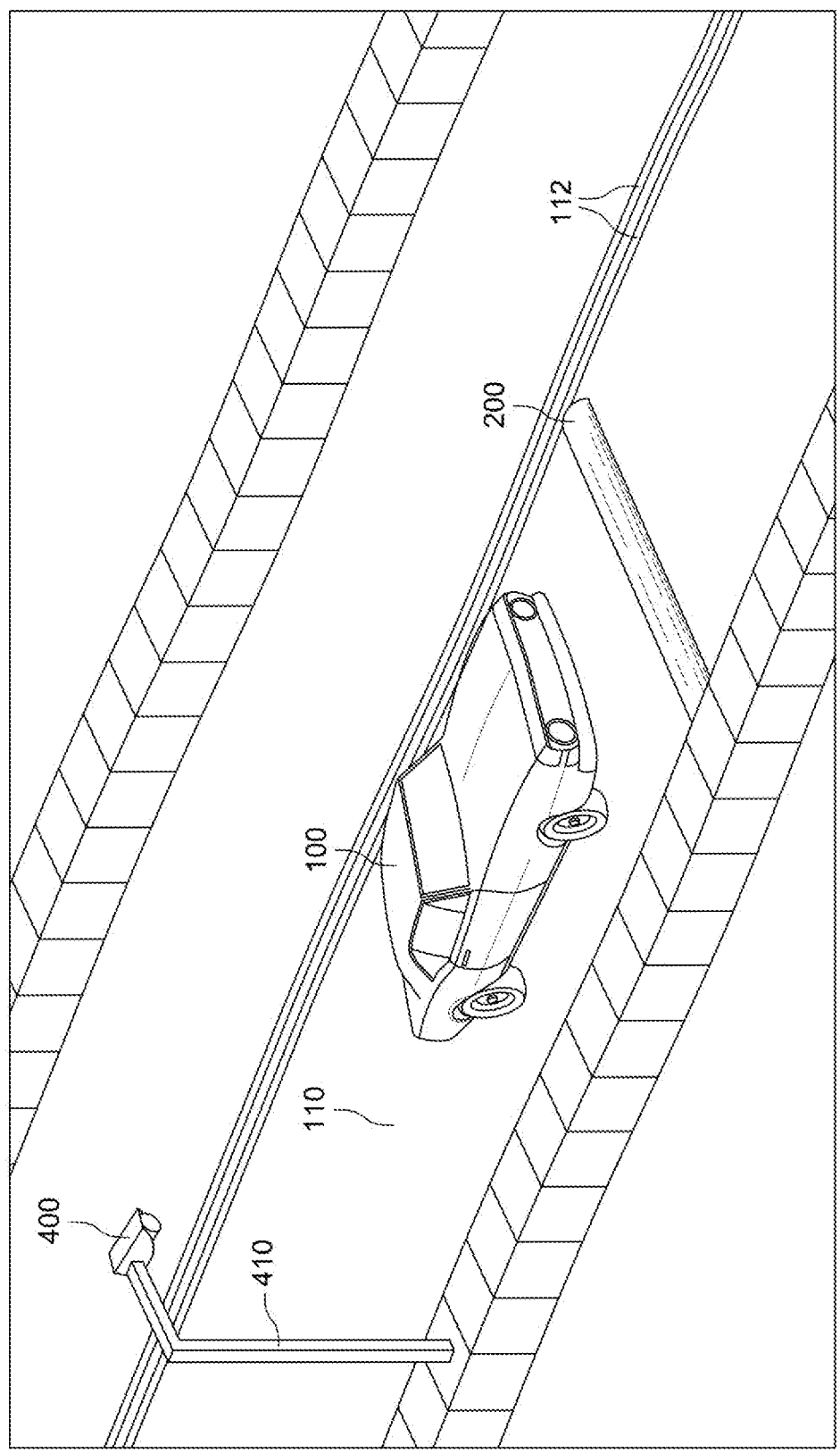
FIG. 3 illustrates a perspective view of the system for reducing speed of a vehicle in accordance with an embodiment of the present invention.

In accordance with an embodiment of the present invention, the at least one protruding element (200) is positioned at either left side or right side of the roadway (110), as shown in FIGS. 2 and 3. Further, the at least one protruding element (200) is positioned on a surface of a down-hill portion of the roadway (110), as shown in FIG. 1. In other words, the at least one protruding element (200) is positioned on one side of the down-hill portion of the roadway (110) being the left side or the right side of the roadway (110) in order to reduce the speed of the moving vehicle (100) without causing any damage to the vehicle (100). Furthermore, the at least one protruding element (200) is positioned in a transverse direction with respect to a longitudinal axis of the roadway (110). Also, the at least one protruding element (200) is positioned on, but not limited to, a level roadway (110).

In accordance with an embodiment of the present invention, the at least one protruding element (200) is straight or curved. Further, the at least one protruding element (200) has, but not limited to, a rectangular shape, square shape, elliptical shape, semi-circular shape, or triangular shape. Furthermore, the at least one protruding element (200) is multiple rows of road studs embedded on the surface of the roadway (110). In particular, the at least one protruding element (200) may be a speed bump, speed hump, speed table, speed cushion, rumbling strip, or road studs having the rectangular shape, square shape, elliptical shape, semi-circular shape, or triangular shape.

In accordance with an embodiment of the present invention, the at least one protruding element (200) is a combination of multiple rows of road studs embedded on the surface of the roadway (110), and a protruding element (200) having, but not limited to, a rectangular shape, square shape, elliptical shape, semi-circular shape, or triangular shape to effectively reduce the speed of the moving vehicle (100).

In accordance with an embodiment of the present invention, the surface of the roadway (110), as shown in FIGS. 2 and 3, is provided with solid double lines (112) beside the at least one protruding element (200) that is configured to prohibit lane changing by the vehicle (100) in order to go around and avoid the at least one protruding element (200). Generally, the solid double lines (112) for prohibiting the lane changing by the vehicle (100) are provided in the middle of the roadway (110). Further, the solid double lines (112) for prohibiting the lane changing by the vehicle (100) may be continuous solid lines or broken solid lines. Furthermore, one of the lines may be a solid line for downhill traffic to avoid the at least one protruding element (200) and one of the lines may be a broken line for the uphill traffic.

In accordance with an embodiment of the present invention, the sign boards such as, but not limited to, "no passing", "no changing lanes" or "do not enter" may be installed on the roadway (110) to make the moving vehicle (100) aware not to go around and avoid the at least one protruding element (200).

In accordance with an embodiment of the present invention, the at least one camera (400) is located away from the at least one protruding element (200) such that the at least one camera (400) is able to capture images of a monitored area of the roadway (110) which is provided with the at least one protruding element (200). Further, the at least one camera (400) is configured to capture at least one image of the moving vehicle (100) which is going around and avoiding the at least one protruding element (200) in the monitored area of the roadway (110).

In accordance with an embodiment of the present invention, the at least one camera (400) is mounted on a mast (410) to position the camera (400) at an elevation above the roadway (110), as shown in FIGS. 2 and 3. The at least one camera (400) may be positioned at a certain elevation above the roadway (110) as per the requirement. Further, the at least one camera (400) is, but not limited to, a video camera.

In accordance with an embodiment of the present invention, the system (1000) for reducing speed of the vehicle (100) further comprises a controlling means (not shown) wirelessly connected with the at least one camera (400). The controlling means is configured to display the at least one image of the moving vehicle (100) going around and avoiding the at least one protruding element (200) in the monitored area of the roadway (110). Further, the controlling means generates a penalty ticket or a fine ticket when the at least one camera (400) captures at least one image of the moving vehicle (100) going around and avoiding the at least one protruding element (200) in the monitored area of the roadway (110). According to one embodiment, the controlling means is any electronic controller or processor having a wireless transceiver and a storage with an algorithm stored in it to receive feed from the camera (400), process and detect vehicles avoiding the protruding element (200) and display image of the vehicle (100).

In other words, when the moving vehicle (100) does not slow down to avoid reducing the speed of the vehicle (100) and changes the lane by going around the solid double lines (112) provided on the roadway (110) thus, avoiding the at least one protruding element (200) in the monitored area of the roadway (110), then the at least one camera (400) captures the at least one image of the moving vehicle (100). Thereafter, the information of the collected images is sent to the controlling means which displays the at least one captured image of the moving vehicle (100) going around and avoiding the at least one protruding element (200) in the monitored area of the roadway (110) and generates the penalty ticket or the fine ticket against that over speeding vehicle (100). The penalty ticket or the fine ticket is sent to the owner of the vehicle (100) through, but not limited to, SMS (short message service) or an email. Further, the penalty ticket or the fine ticket may be uploaded on a specific website from where the penalty ticket or the fine ticket may be obtained by the owner of the vehicle (100) against which the penalty ticket or the fine ticket is issued.

In accordance with an embodiment of the present invention, a method for reducing speed of the vehicle (100) is disclosed. At a first step of the method, the at least one protruding element (200) is positioned on the surface of the roadway (110) such that the at least one protruding element (200) interrupts the smooth movement of the vehicle (100). The at least one protruding element (200) is positioned at either left side or right side of the roadway (110). In particular, the at least one protruding element (200) is positioned on the surface of the down-hill portion of the roadway (110), as shown in FIG. 1. The at least one protruding element (200) is positioned in a transverse direction with respect to a longitudinal axis of the roadway (110). The at least one protruding element (200) positioned on the surface of the down-hill portion of the roadway (110) reduces the speed of the moving vehicle (100) and thus, increases the fuel efficiency without causing any wear and tear to the vehicle (100) or the components of the vehicle (100).

In accordance with an embodiment of the present invention, the surface of the roadway (110), as shown in FIGS. 2 and 3, is provided with solid double lines (112) beside the at least one protruding element (200) which is configured to prohibit lane changing on the roadway (110) in order to go around and avoid the at least one protruding element (200).

Further, the sign boards such as, but not limited to, "no passing", "no changing lanes" or "do not enter" may be installed on the roadway (110) to make the moving vehicle (100) aware not to go around and avoid the at least one protruding element (200). Also, one of the lines may be a solid line for downhill traffic to avoid the at least one protruding element (200) and one of the lines may be a broken line for the uphill traffic. Further, switching lanes or changing lanes is deterrent to the vehicles or drivers going in downhill direction. Accordingly, the solid double lines (112) or the combination of one solid line and one broken line avoids the lane changing in the downhill direction.

In accordance with an embodiment of the present invention, at second step of the method, the at least one camera (400) is located away from the at least one protruding element (200) such that the at least one camera (400) is able to capture images of a monitored area of the roadway (110) which is provided with the at least one protruding element (200). Further, the at least one camera (400) is mounted on a mast (410) to position the camera (400) at an elevation above the roadway (110), as shown in FIGS. 2 and 3. Further, the elevation may be set as per the requirement. In particular, the at least one camera (400) is, but not limited to, a video camera.

In accordance with an embodiment of the present invention, at third step of the method, the at least one image of the moving vehicle (100) is captured which is going around and avoiding the at least one protruding element (200) in the monitored area of the roadway (110), by the at least one camera (400).

In accordance with an embodiment of the present invention, the method for reducing speed of a vehicle (100), further comprises a step of wirelessly connecting a controlling means with the at least one camera (400). The controlling means displays the at least one image of the moving vehicle (100) which is going around and avoiding the at least one protruding element (200) in the monitored area of the roadway (110). In other words, the information of the collected images is sent to the controlling means which displays the at least one captured image of the moving vehicle (100) going around and avoiding the at least one protruding element (200) in the monitored area of the roadway (110). Thereafter, the controlling means generates the penalty ticket or the fine ticket when the at least one camera (400) captures at least one image of the moving vehicle (100) going around and avoiding the at least one protruding element (200) in the monitored area of the roadway (110). According to one embodiment, the controlling means is any electronic controller or processor having a wireless transceiver and a storage with an algorithm stored in it to receive feed from the camera (400), process and detect vehicles avoiding the protruding element (200) and display image of the vehicle (100).

In accordance with an embodiment of the present invention, the penalty ticket or the fine ticket is sent to the owner of the vehicle (100) through, but not limited to, SMS (short message service) or an email. Further, the penalty ticket or the fine ticket may be uploaded on a specific website from where the penalty ticket or the fine ticket may be generated by the owner of the vehicle (100) against which the penalty ticket or the fine ticket is issued.

In accordance with an embodiment of the present invention, the system (1000) for reducing speed of a vehicle (100) effectively reduces the speed of the vehicle and controls the flow of traffic and traffic jams thus, reducing the environmental pollution. Further, the system (1000) for reducing speed of a vehicle (100) increases the fuel efficiency by avoiding vehicle breakdown or damage to the parts or components of the moving vehicle (100), thereby further reducing the environmental pollution. In particular, the system (1000) for reducing speed of a vehicle (100) reduces the fuel wastage and excess wear and tear of the vehicle (100) by half for traffic on both sides of the roadway (110).

In accordance with an embodiment of the present invention, the system (1000) for reducing speed of a vehicle (100) may be installed on level-roadways (110) where the high speed vehicles need to be restrained such as, but not limited to, areas near to hospitals, medical centres, senior citizens homes, government facilities/offices or the like.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system (1000) for reducing speed of a vehicle (100), comprising:
    at least one protruding element (200) positioned on a surface of a roadway (110) such that said at least one protruding element (200) interrupts a smooth movement of said vehicle (100); and
    at least one camera (400) located away from said at least one protruding element (200) such that said at least one camera (400) is able to capture images of a monitored area of said roadway (110) provided with said at least one protruding element (200);
    wherein said at least one camera (400) is configured to capture at least one image of a moving vehicle (100) going around and avoiding said at least one protruding element (200) in said monitored area of said roadway (110);
    wherein said surface of said roadway (110) is provided with a solid line for a downhill traffic and a broken line for an uphill traffic beside said at least one protruding element (200) and configured to prohibit lane changing to go around and avoid said at least one protruding element (200);
    wherein said controlling means generates a penalty ticket or a fine ticket when said at least one camera (400) captures at least one image of said moving vehicle (100) going around and avoiding said at least one protruding element (200) in said monitored area of said roadway (110); and
    wherein said penalty ticket or fine ticket is sent via a SMS (short message service) or an email.

2. The system (1000) for reducing speed of a vehicle (100) according to claim 1, wherein said at least one protruding element (200) is positioned at either left side or right side of said roadway (110).

3. The system (1000) for reducing speed of a vehicle (100) according to any of the preceding claims, wherein said at least one protruding element (200) is positioned on a surface of a down-hill portion of said roadway (110).

4. The system (1000) for reducing speed of a vehicle (100) according to any of the preceding claims, wherein said at least one protruding element (200) is positioned on a level roadway (110).

5. The system (1000) for reducing speed of a vehicle (100) according to any of the preceding claims, wherein said at least one protruding element (200) is positioned in a transverse direction with respect to a longitudinal axis of said roadway (110).

6. The system (1000) for reducing speed of a vehicle (100) according to any of the preceding claims, wherein said at least one protruding element (200) is straight or curved.

7. The system (1000) for reducing speed of a vehicle (100) according to any of the preceding claims, wherein said at least one protruding element (200) has a rectangular shape, square shape, elliptical shape, semi-circular shape, or triangular shape.

8. The system (1000) for reducing speed of a vehicle (100) according to any of the preceding claims, wherein said at least one protruding element (200) is multiple rows of road studs embedded on said surface of said roadway (110).

9. The system (1000) for reducing speed of a vehicle (100) according to any of the preceding claims, wherein said at least one camera (400) is mounted on a mast (410) to position said camera (400) at an elevation above said roadway (110).

10. The system (1000) for reducing speed of a vehicle (100) according to any of the preceding claims, wherein said at least one camera (400) is a video camera.

11. The system (1000) for reducing speed of a vehicle (100) according to any of the preceding claims, further comprising a controlling means wirelessly connected with said at least one camera (400).

12. The system (1000) for reducing speed of a vehicle (100) according to any of the preceding claims, wherein said controlling means displays said at least one image of said moving vehicle (100) going around and avoiding said at least one protruding element (200) in said monitored area of said roadway (110).

13. A method for reducing speed of a vehicle (100), comprising the steps of:
    positioning at least one protruding element (200) on a surface of a roadway (110) such that said at least one protruding element (200) interrupts a smooth movement of said vehicle (100);
    locating at least one camera (400) away from said at least one protruding element (200) such that said at least one camera (400) is able to capture images of a monitored area of said roadway (110) provided with said at least one protruding element (200); and
    capturing at least one image of a moving vehicle (100) going around and avoiding said at least one protruding element (200) in said monitored area of said roadway (110), by said at least one camera (400);
    wherein said surface of said roadway (110) is provided with a solid line for a downhill traffic and a broken line for an uphill traffic beside said at least one protruding element (200) and configured to prohibit lane changing to go around and avoid said at least one protruding element (200);

wherein said controlling means generates a penalty ticket or a fine ticket when said at least one camera (400) captures at least one image of said moving vehicle (100) going around and avoiding said at least one protruding element (200) in said monitored area of said roadway (110); and wherein said penalty ticket or fine ticket is sent via a SMS (short message service) or an email.

14. The method for reducing speed of a vehicle (100) according to claim 13, wherein said at least one protruding element (200) is positioned at either left side or right side of said roadway (110).

15. The method for reducing speed of a vehicle (100) according to any of the preceding claims 13-14, wherein said at least one protruding element (200) is positioned on a surface of a down-hill portion of said roadway (110).

16. The method for reducing speed of a vehicle (100) according to any of the preceding claims 13-15, wherein said at least one protruding element (200) is positioned in a transverse direction with respect to a longitudinal axis of said roadway (110).

17. The method for reducing speed of a vehicle (100) according to claim 13, wherein said at least one camera (400) is mounted on a mast (410) to position said camera (400) at an elevation above said roadway (110).

18. The method for reducing speed of a vehicle (100) according to claim 13, wherein said at least one camera (400) is a video camera.

19. The method for reducing speed of a vehicle (100) according to claim 13, further comprising a step of wirelessly connecting a controlling means with said at least one camera (400).

20. The method for reducing speed of a vehicle (100) according to claim 13, wherein said controlling means displays said at least one image of said moving vehicle (100) going around and avoiding said at least one protruding element (200) in said monitored area of said roadway (110).

\* \* \* \* \*